United States Patent [19]

Loubier

[11] Patent Number: 5,382,851
[45] Date of Patent: Jan. 17, 1995

[54] SWING-TYPE ACTUATOR

[75] Inventor: Robert J. Loubier, Roanoke, Ind.

[73] Assignee: Xolox Corporation, Fort Wayne, Ind.

[21] Appl. No.: 237,687

[22] Filed: May 4, 1994

[51] Int. Cl.$^6$ ............................................. H02K 33/00
[52] U.S. Cl. ........................................... 310/13; 310/42
[58] Field of Search ..................... 310/13, 15, 42, 43; 360/104, 105, 106

[56] References Cited

U.S. PATENT DOCUMENTS

| | | | |
|---|---|---|---|
| 4,150,407 | 4/1979 | Dijkstra | 300/106 |
| 4,196,456 | 4/1980 | Manzke et al. | 360/106 |
| 4,439,792 | 3/1984 | Van De Bult | 360/106 |
| 4,544,973 | 10/1985 | Van De Bult | 360/106 |
| 4,553,058 | 11/1985 | Iwasaki | 310/268 |
| 4,639,624 | 1/1987 | Ejiri et al. | 310/154 |
| 4,849,840 | 7/1989 | Fujioka | 360/104 |
| 4,855,853 | 8/1989 | Matsushita et al. | 360/106 |
| 4,860,135 | 8/1989 | Cain | 360/106 X |
| 4,875,117 | 10/1989 | Slezak et al. | 360/106 X |
| 4,879,617 | 11/1989 | Sampietro et al. | 360/106 |
| 4,949,194 | 8/1990 | MacPherson et al. | 360/104 |
| 4,985,652 | 1/1991 | Oudet et al. | 310/15 |
| 4,994,931 | 2/1991 | Foote | 360/106 |
| 5,034,837 | 7/1991 | Schmitz | 360/105 |
| 5,063,465 | 11/1991 | Fujioka | 360/104 |
| 5,105,321 | 4/1992 | Ohkita et al. | 360/106 |
| 5,113,297 | 5/1992 | Yoshida | 360/106 |
| 5,122,703 | 6/1992 | Takahashi et al. | 310/36 |
| 5,146,450 | 9/1992 | Brooks et al. | 369/244 |
| 5,148,071 | 9/1992 | Takahashi | 310/208 |
| 5,165,090 | 11/1992 | Takahashi et al. | 369/215 |
| 5,168,184 | 12/1992 | Umehara et al. | 310/13 |
| 5,168,185 | 12/1992 | Umehara et al. | 310/15 |
| 5,184,265 | 2/1993 | Foote et al. | 360/106 |
| 5,189,576 | 2/1993 | Morehouse et al. | 360/105 |
| 5,189,577 | 2/1993 | Nishida et al. | 360/106 |
| 5,214,552 | 5/1993 | Haga | 360/106 |
| 5,305,169 | 4/1994 | Anderson et al. | 310/105 |

FOREIGN PATENT DOCUMENTS

| | | | |
|---|---|---|---|
| 2952095 | 7/1990 | Germany | 310/43 |
| 55-67975 | 5/1980 | Japan . | |
| 56-19561 | 2/1981 | Japan . | |
| 59-124066 | 7/1984 | Japan . | |
| 60-159566 | 10/1985 | Japan . | |
| 63-142574 | 6/1988 | Japan . | |
| 64-89946 | 4/1989 | Japan . | |
| 2-310865 | 12/1990 | Japan . | |

Primary Examiner—Steven L. Stephan
Assistant Examiner—Judson H. Jones
Attorney, Agent, or Firm—Barnes & Thornburg

[57] ABSTRACT

A swing-type actuator includes a coil, at least one arm and a thermoplastic body joining the coil and the arm. In one embodiment, the arm is preferably a generally planar aluminum stamping having an opening to which the read/write head may be mounted at one end thereof. A feature is located in the opposite end of the arm to facilitate attachment to the thermoplastic body. The arm also includes at least one flat side perpendicular to its plane at the end including the notch. The body is molded around a portion of the arm and cooperates with the feature to secure the arm thereto. The body also overlaps part of the coil and surrounds the outer circumference thereof. A journal is formed in the body for receiving a shaft on which the actuator pivotally rotates. A grounding pin extending through the arm prevents static charge build-up. Alternatively, a portion of the arm may extend into the journal to contact the bearing. According to another embodiment of the present invention, the arm includes a plastic portion and a metal mounting pad. The plastic portion is molded around a securement portion of the mounting pad to form the arm. The body is then molded around portions of the arm and the coil in the same manner as the first embodiment of the invention. The plastic portion of the arm is preferably formed of electrically conductive material and is provided with a grounding pin to facilitate discharging of static charge.

49 Claims, 2 Drawing Sheets

SWING-TYPE ACTUATOR

BACKGROUND AND SUMMARY OF THE INVENTION

The present invention relates to swing-type actuators for positioning read/write heads in memory storage devices and, more particularly, to an improved swing-type actuator constructed partially from plastic.

Numerous swing-type actuators are known in the prior art. Representative examples include those shown in U.S. Pat. No. 4,985,652 to Oudet, et al. and U.S. Pat. No. 4,916,456 to Manzke, et al. Such devices typically include a coil secured to one or more longitudinally extending arms. If more than one arm is utilized, the plurality of arms is known as an "E-block". A read/write head is typically attached to each arm on the end opposite the coil. The actuator is pivotally secured about a shaft such that the read/write head is positioned adjacent a data disk and the coil is placed in a magnetic field by, for example, positioning it adjacent one or more permanent magnets. Current is supplied to the coil, thereby generating an electromagnetic force and causing movement of the coil within the preexisting magnetic field. Correspondingly, the arms pivot about the shaft to move the read/write heads to selected locations adjacent the disk.

In some embodiments of the above-described swing-type actuator, the arm is constructed from metal, such as aluminum. Metal arms have several advantages, including the ability to more readily and securely attach read/write heads to the arm, the ability to maintain exacting tolerances for the arm, and the relative ability to more easily machine features into the arm. The coil is typically attached to metal arms by means of screws, similar fasteners or adhesives. However, for various reasons, including ease of manufacturing, it has been found desirable to secure the coil to the arm by injection molding thermoplastic material around a portion of the coil and a portion of the arm. Examples of such actuators include U.S. Pat. No. 5,122,703 to Takahashi, et al., as well as numerous earlier actuators manufactured by the assignee of the present application.

Although the above-described actuators are all acceptable for their intended uses, they do have certain undesirable features. For example, an aluminum E-block can be relatively expensive to manufacture. Additionally, it may be desirable to provide an actuator having a lower overall weight than one utilizing an aluminum E-block, thereby reducing inertia and momentum and the attendant forces necessary to move and stop the actuator. Accordingly, all-plastic actuators have been proposed. In such actuators, the coil is placed in a mold and the actuator arm is simultaneously formed from a thermoplastic material and molded to the coil. Examples of such actuators include U.S. Pat. No. 5,165,090 to Takahashi, et al., as well as earlier actuators manufactured by the assignee of the present application.

Although all-plastic actuators may be suitable for their intended purpose, they lack some of the more desirable properties of actuators having metal arms. For example, it has been determined that the read/write head may be more easily and readily attached to a metal component than a plastic one. Similarly, it may be easier to machine features into metal than plastic.

Accordingly, it is an object of the present invention to provide an improved swing-type actuator for carrying a read/write head.

Another object of the present invention is the provision of a swing-type actuator that is lightweight and durable.

Yet another object of the present invention is the provision of a swing-type actuator that allows for easy and secure attachment of the read/write head to the actuator arm.

Another object of the present invention is the provision of a swing-type actuator that can have a read/write head secured thereto with a staking ball and eyelet combination.

Still another object of the present invention is the provision of a swing-type actuator having an arm capable of being machined to include desired features.

These and other objects of the present invention are attained by the provision of a swing-type actuator which comprises a coil, at least one arm formed from metal and having a first end and a second end, and a molded thermoplastic body which includes a journal disposed between the first end of the arm and the coil. The body is molded about a portion of the first end of the arm and at least a portion of the coil so as to secure the arm and coil to the body.

In one embodiment of the present invention, the arm is a stamping having a generally flat portion of uniform thickness and at least one flat surface on one edge thereof. The molded body surrounds a portion of the flat surface. One end of the arm includes a feature that cooperates with a portion of the body to secure the arm to the body, and the other end of the arm has a hole therein for attaching a read/write head to the arm. The arm includes at least one wire guide machined therein for receiving a wire which attaches to the read/write head.

In another embodiment of the present invention, the arm includes a hole therein for reducing the mass of the arm.

In another embodiment of the present invention, the actuator includes a bobbin having a body, a plurality of terminal pin sleeves having terminal pins disposed therein and a bridge member joining the body and the sleeves. The coil includes a plurality of lead wires attached to the terminal pins and the coil is disposed about the body of the bobbin.

According to yet another embodiment of the present invention, a swing-type actuator includes a coil, at least one arm and a molded thermoplastic body. The arm includes first and second ends and comprises a plastic portion and a metal mounting pad. The body has a first portion molded about a portion of the coil to join the coil to the body, and a second portion molded about the first end of the arm to join it to the body.

In still another embodiment of the present invention, the mounting pad includes a body portion, a securement portion for securing the mounting pad to the plastic portion and an attachment portion for attaching a read/write head to the mounting pad. The attachment portion includes a hole therein for attaching a read/write head to the mounting pad and has beveled edges for accommodating the tooling used to attach the read/write head to the mounting pad. Both the attachment portion and the securement portion extend generally perpendicularly from the body. The plastic portion surrounds the securement portion so as to secure the mounting pad to the plastic portion. Additionally, the plastic portion is electrically conductive.

According to another embodiment of the invention, the plastic portion of the arm includes at least one wire guide. The wire guide may take the form of staggered protrusions extending from the plastic portion.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
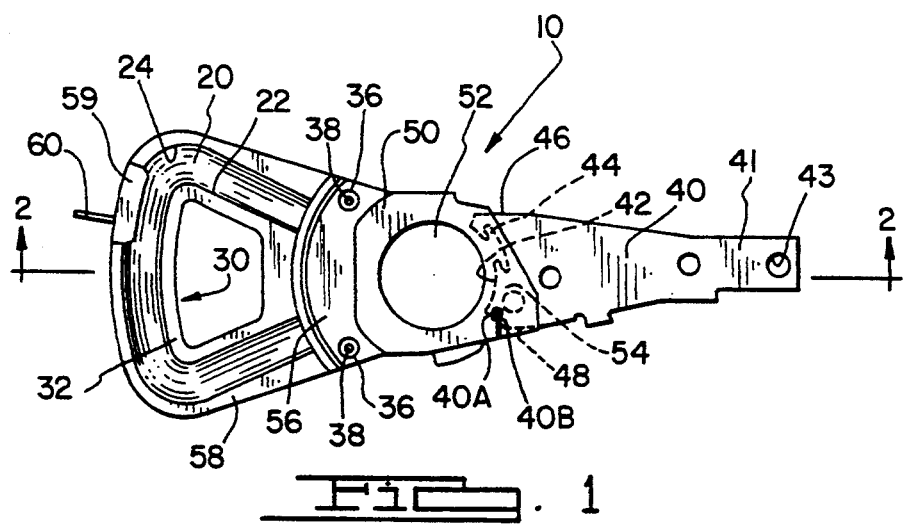
FIG. 1 is a top plan view of a swing-type actuator according to the present invention.
Figure 2:
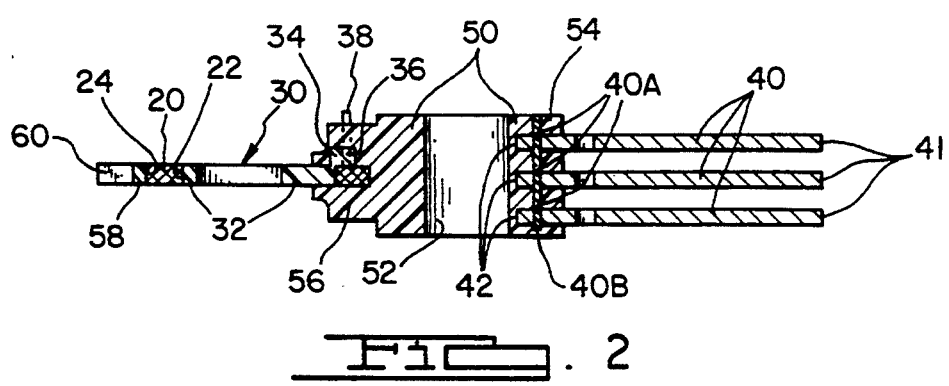
FIG. 2 shows a cross-sectional view taken along line 2—2 in FIG. 1.

FIG. 1 shows a top plan view of a swing-type actuator 10 according to the present invention. Actuator 10 comprises coil 20, bobbin 30, arms 40 and body 50. Coil 20 has an inner circumference 22 and an outer circumference 24. Coil 20 is formed by winding wires, preferably resin-coated copper, around a mandrel. Coil 20 may then be press-fit around bobbin 30, as described in co-pending U.S. patent application Ser. No. 08/243,476 filed on May 16, 1994, the disclosure of which is hereby incorporated by reference. Bobbin 30 includes body 32, bridge member 34, and terminal pin sleeves 36. Bridge member 34 extends upwardly and behind body 32 and joins body 32 to terminal pin sleeves 36. Bridge member 34 can be better seen in FIG. 2. Two terminal pins 38 are secured in bobbin terminal pin sleeves 36. Bobbin 30 is preferably molded from a thermoplastic material. After positioning coil 20 around bobbin 30, the free ends of coil 20 are secured to terminal pins 38. Current may be supplied to coil 20 via terminal pins 38, as is commonly known in the art. A tang 60 extends from one end of coil 20. Tang 60 interacts with a stop member to limit the angular displacement of actuator 10.

Figure 4:
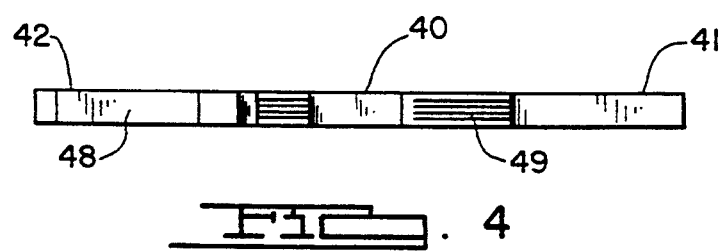
FIG. 4 is a side plan view of the arm of FIG. 3.

Arms 40 are generally flat members of uniform thickness having first end 41 and second end 42. Each arm 40 has an opening 43 in first end 41. Read/write heads may be attached to arms 40 via openings 43 in a manner commonly known in the industry. Arms 40 further include a feature 44 in second end 42. Feature 44 is shown as a notch for purposes of example. Two flat surfaces 46 and 48 are formed on each edge of second end 42. Flat surfaces 46 and 48 assist in properly aligning arms 40 in a mold during the formation of body 50, described below. Arms 40 further include wire guides 49 on one side thereof (FIG. 4). Wire guides 49 provide a track for wires running to the read/write heads. Each arm 40 also includes a hole 40A that receives a conductive pin 40B via an interference fit. Pin 40B is used to ground arms 40, as described below.

Arms 40 may be formed by stamping from a sheet of aluminum and then machining wire guides 49 into the sides. This method of manufacturing arms 40 has the advantage of being relatively inexpensive when compared to the cost of an aluminum E-block. Thus, by eliminating the E-block completely, the present invention results in a significant cost savings. Alternatively, arms 40 may be stamped from a sheet of magnesium. Magnesium has lower mass than aluminum and, therefore, results in an actuator with lower inertial mass.

Figure 3:
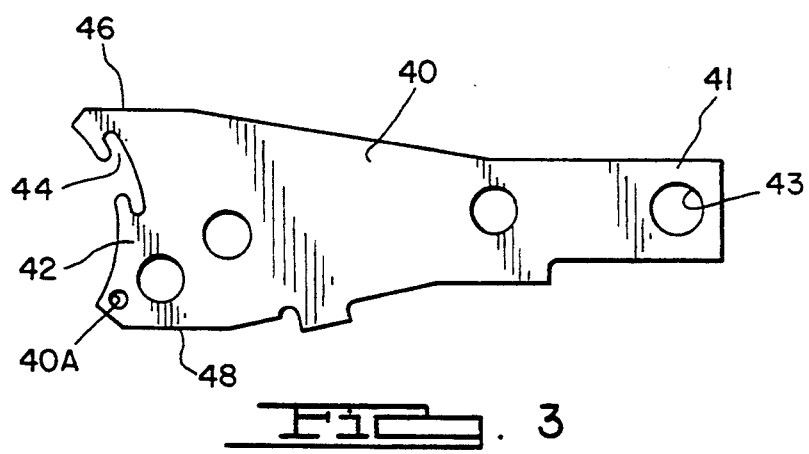
FIG. 3 is a top plan view of an embodiment of an arm used in conjunction with the actuator shown in FIG. 1.
Figure 5:
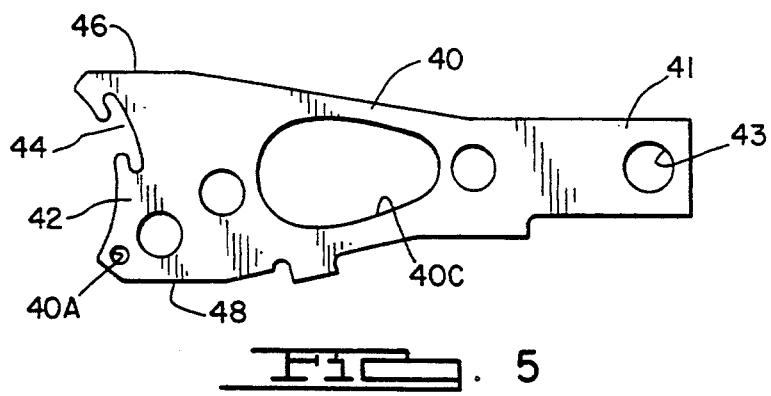
FIG. 5 is a top plan view of an alternative embodiment of a swing-type actuator according to the present invention.

FIG. 5 shows an alternative embodiment of arm 40. Due to the degree of overall similarity existing between the embodiments of FIGS. 3 and 5, like reference numerals are used for corresponding structures in each figure. In this embodiment, a hole 40C is formed in arm 40. The presence of hole 40C reduces the amount of material comprising arm 40. Accordingly, the inertial mass of actuator 10 is also reduced. Hole 40C may be of any size desired, so long as it is not made so large as to reduce the structural integrity of arm 40.

Body 50 includes journal 52 for receiving a cartridge bearing assembly about which actuator 10 rotates. Body 50 further includes an arm joining portion 54 surrounding second end 42 of arm 40. Arm joining portion 54 also fills notch 44 in arm 40 to further assist in securing arm 40 to body 50. Body 50 also includes coil joining portion 56. Coil joining portion 56 includes peripheral portion 58 surrounding coil 20. As is known in the industry, a tang 60 may be provided on actuator 10. If so, tang securement portion 59 is integrally formed with peripheral portion 58 and secures tang 60 to coil 20.

To assemble actuator 10, coil 20, bobbin 30, tang 60 and second end 42 of arms 40 are inserted into a mold. A thermoplastic material is then injected into the mold to form body 50. During the injection process, arm joining portion 54 and coil joining portion 56 of body 50 are formed. These features may be more clearly seen in FIG. 2. As shown in that figure, arm joining portion 54 surrounds second end 42 of each arm 40. Additionally, arm joining portion 54 fills feature 44 of each arm 40, thereby providing better bonding. Similarly, coil joining portion 56 overlaps coil 20 and bobbin 30 just beyond bridge member 34 of bobbin 30. Peripheral portion 58 is also formed around coil 20 during the molding process. Additionally, tang securement portion 59 surrounds a portion of tang 50 and secures it to coil 20. An extended portion of pin 40B is folded over the top arm 40 and secured to the ground pad of a circuit board (not shown) attached to the side of actuator 10, as is commonly known in the art. This prevents the build up of static charge on arms 40, which can result from the spinning of the magnetic discs.

Figures 6, 7:
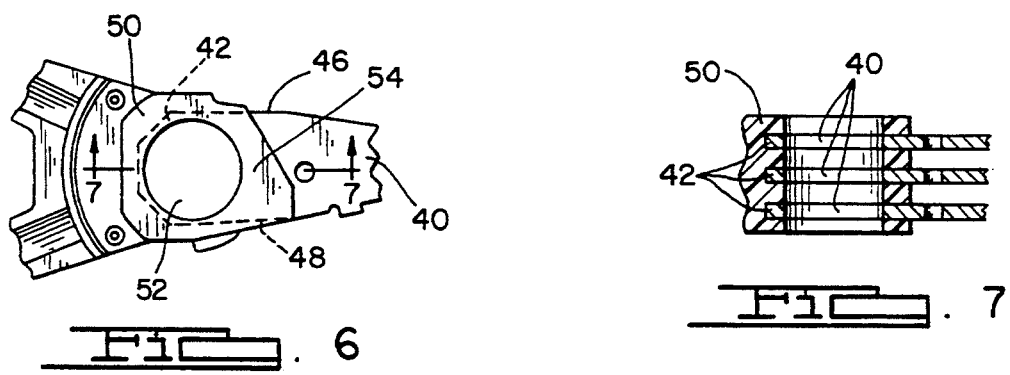
FIG. 6 is a partial, top plan view of another embodiment of a swing-type actuator according to the present invention.
FIG. 7 is a cross-sectional view taken along line 7—7 of in FIG. 6.

FIG. 6 shows a partial top plan view of another embodiment of a swing-type actuator according to the present invention. Again, like reference numerals have been used for corresponding structures between this embodiment and those shown in FIGS. 3 and 5. This embodiment utilizes an alternative grounding method. In this embodiment, second end 42 of arm 40 is extended beyond journal 52 of body 50. Each arm 40 is provided with an opening. Arms 40 are placed in a mold with the other components of actuator 10 and body 50 is molded such that journal 52 is concentric with the openings in arms 40. Journal 52 and the openings in arms 40 are then drilled out to the desired diameter. In this manner, a portion of each arm 40 is exposed in journal 52. This can be seen in FIG. 7. When actuator 10 is placed on the cartridge bearing assembly, the exposed portions of arms 40 will contact the bearing assembly. In this manner, arms 40 are grounded through contact with the bearing.

Actuator 10 of the present invention operates in basically the same manner as the prior art actuators described above. Specifically, journal 52 of body 50 is placed over a shaft about which actuator 10 may rotate. Coil 20 is placed in a magnetic field and arms 40, with read/write heads attached thereto via openings 43, are positioned such that the read/write heads are disposed adjacent data disks. Wires lead from the read/write heads to a circuit board attached to the side of actuator 10, as is known in the art. The wires are disposed in wire guides 49 and secured with adhesive. Current is supplied to coil 20 via terminal pins 38, thereby causing rotation of actuator 10 as previously described. In this manner, the read/write head is positioned on the computer disk.

Figure 8:
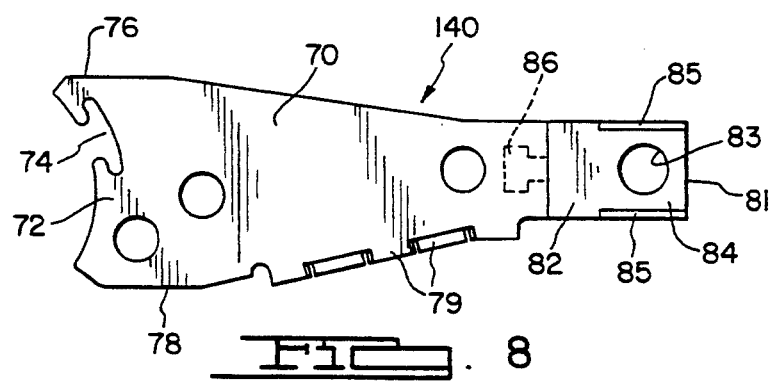
FIG. 8 is another alternative embodiment of an arm for use in conjunction with a swing-type actuator according to the present invention.
Figures 9, 10:
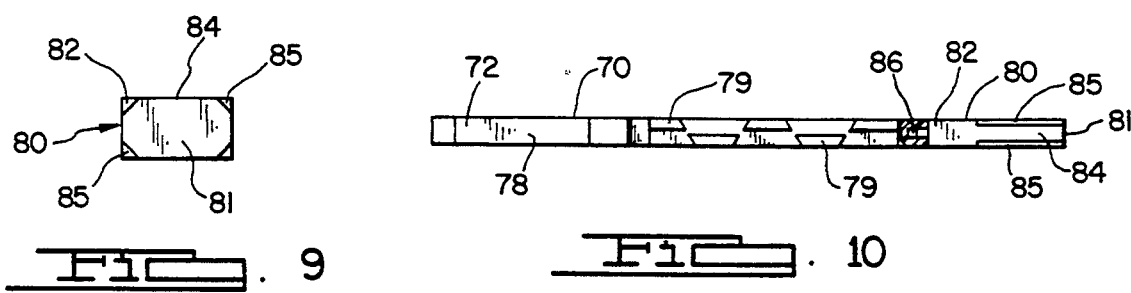
FIG. 9 is an end view of a mounting pad which is a component of the arm shown in FIG. 8.
FIG. 10 is a partial cut-away side plan view of the arm shown in FIG. 8.

An alternative embodiment of the arm is shown in FIGS. 8 through 10 and is indicated by reference number 140. In this embodiment, arm 140 comprises plastic portion 70 and mounting pad 80. Plastic portion 70 includes an end 72, which forms the first end of arm 140. Plastic portion 70 further includes feature 74 and flat sides 76 and 78. Feature 74 and flat sides 76 and 78 correspond to feature 44 and flat sides 46 and 48 in the previously described embodiments of arm 40.

Mounting pad 80 comprises base 82, attachment portion 84, and securement portion 85. Attachment portion 84 includes a hole 83 therein for mounting a read/write head to mounting pad 80 in a manner commonly known in the industry. Attachment portion 84 further includes beveled edges 85, which accommodate the tooling utilized to remove a read/write head from arm 140, if necessary. Securement portion 85 extends from base 82 on a side opposite attachment portion 83. In the embodiment shown, securement portion 85 is a generally T-shaped member that is thinner and narrower than base 82. Securement portion 85 is used to secure mounting pad 80 to plastic portion 70 as described below. Mounting pad 80 is preferably formed form aluminum or magnesium.

To form the arm 140, mounting pad 80 is placed in a mold and the mold is injected with plastic to form plastic portion 70. As plastic portion 70 is formed, the plastic surrounds securement portion 85 of mounting pad 80, thereby providing better attachment of mounting pad 80 to plastic portion 70. Note that it is not necessary that securement portion 85 be T-shaped. Rather, any of a number of shapes may be utilized that provide a protrusion on mounting pad 80 around which plastic portion 70 may be formed.

To prevent build up of the static charge on arm 140, the plastic used to mold plastic portion 70 is preferably a glass and carbon reinforced thermoplastic. The presence of the carbon makes the plastic conductive. Thus, plastic portion 70 may be grounded in the same manner as the all metal embodiments of arm 40.

To form an actuator 10 utilizing arm 140, coil 20, bobbin 30, tang 60 and arm 140 are placed into the same type of mold used in conjunction with arm 40 and body 50 is formed in the same manner as described above. Alternatively, arm 140 could be molded at the same time body 50 is formed. However, molding arm 140 separately allows utilization of less complex molds. This is particularly true because unlike plastic portion 70 of arm 140, body 50 is formed from a nonconductive plastic. This is necessary since, to do otherwise, would short out the terminal pins of the coil. Thus, molding arm 140 at the same time as body 50 would require injecting different portions of the mold with different plastics. Alternatively, bobbin 30 and terminal pin sleeves 36 can be formed such that terminal pins 38 are isolated from body 50 by the nonconductive bobbin. If so, the same conductive plastic could be used to form body 50 and plastic portion 70. Arms 140 would then be grounded through contact between journal 52 and the bearing on which it pivots. The insulation on the wires that form coil 20 shield coil 20 from the conductive plastic.

Although not shown in FIGS. 8 through 10, arm 140 may be provided with machined wire guides similar to wire guides 49 in arm 40. Alternatively, plastic portion 70 of arm 140 may be provided with wire guides in the form of a plurality of protrusions 79 extending therefrom. Protrusions 79 have a dove tail configuration which helps prevent the formation of flash during the molding process. Protrusions 79 are spaced apart vertically such that a wire running from the read/write head may be disposed above the lower protrusions 79 and below the upper protrusions 79. The wire may be secured with adhesive. Similarly, arm 40 could be provided with wire guides in the form of protrusions. Such protrusions could be formed during stamping.

Although the present invention has been described and illustrated in detail, it is to be clearly understood that the same is by way of illustration and example only and is not to be taken by way of limitation. Numerous variations may be made to the embodiment described above without departing from the invention. For example, the number of arms 40 may be varied. Similarly, the configuration of feature 44 may be different from that shown. For example, feature 44 could also be replaced with one or more protrusions extending from the surface of arm 40 to provide a location for increased bonding with arm joining portion 54. This may be particularly advantageous because most thermoplastics shrink as they set. Thus, arm joining portion 54 would firmly grip such protrusions. Also, the length of arms 40, as well as the relative sizes of arms 40 and body 50, may be varied. Furthermore, although in the above described embodiment coil 20 is wound separately on a mandrel and positioned around bobbin 30, coil 20 could alternatively be wound directly on bobbin 30. Accordingly, the spirit and scope of the invention are to be limited only by the claims appended hereto.

What is claimed is:

1. A swing-type actuator, comprising:
    a coil;
    an arm for carrying a read/write head, said arm being formed from metal and having a first end and a second end; and
    a molded thermoplastic body, said body including a journal disposed between said first end of said arm and said coil, wherein said body is molded about a portion of said first end of said arm and at least a portion of said coil so as to secure said arm and said coil to said body.

2. The actuator according to claim 1, wherein said first end of said arm includes a feature that cooperates with a portion of said body to secure said arm to said body.

3. The actuator according to claim 2, wherein said arm includes a generally flat portion of uniform thickness extending between said first and second ends.

4. The actuator according to claim 1, wherein said arm includes at least one flat surface on one edge of said arm for aligning said arm in a mold.

5. The actuator according to claim 4, wherein said body surrounds a portion of said flat surface.

6. The actuator according to claim 1, wherein said arm is a stamping.

7. The actuator according to claim 6, further comprising means formed on said arm for attaching a read/write head to said arm.

8. The actuator according to claim 7, wherein said means for attaching a read/write head includes a hole extending through said arm.

9. The actuator according to claim 1, wherein said arm includes at least one wire guide formed therein for receiving a wire which attaches to the read/write head.

10. The actuator according to claim 1, further comprising a bobbin having a body, a plurality of terminal pin sleeves having terminal pins disposed therein and a bridge member joining said bobbin body and said sleeves.

11. The actuator according to claim 10, wherein said coil includes a plurality of lead wires attached to said terminal pins and said coil is disposed about said bobbin body.

12. The actuator according to claim 1, further comprising a grounding pin, and wherein said arm includes a hole for receiving said grounding pin.

13. The actuator according to claim 12, wherein said grounding pin extends through said arm and outwardly from said body.

14. The actuator according to claim 12, further comprising at least two arms and wherein said grounding pin connects said arms to ground.

15. The actuator according to claim 1, wherein a portion of said arm is exposed within said journal.

16. The actuator according to claim 15, wherein said arms are connected to ground through contact with a bearing disposed in said journal.

17. A swing-type actuator, comprising:
a coil;
an arm for carrying a read/write head, said arm having first and second ends and comprising a plastic portion and a metal mounting pad; and
a molded thermoplastic body having a first portion molded about a portion of said coil to join said coil to said body, and having a second portion molded about said first end of said arm to join said arm to said body.

18. The actuator according to claim 17, wherein said mounting pad includes a base, a securement portion for securing said mounting pad to said plastic portion and an attachment portion for attaching a read/write head to said mounting pad.

19. The actuator according to claim 18, wherein said attachment portion includes means for attaching a read/write head to said mounting pad.

20. The actuator according to claim 19, wherein said means for attaching a read/write head to said mounting pad includes a hole in said attachment portion.

21. The actuator according to claim 20, wherein said attachment portion includes beveled edges.

22. The actuator according to claim 19, wherein said attachment portion extends generally perpendicularly from said base.

23. The actuator according to claim 18, wherein said securement portion extends generally perpendicularly from said base.

24. The actuator according to claim 18, wherein said plastic portion surrounds said securement portion so as to secure said mounting pad to said plastic portion.

25. The actuator according to claim 18, wherein said securement portion is thinner than said base.

26. The actuator according to claim 25, wherein said securement portion is narrower than said base.

27. The actuator according to claim 26, wherein said securement portion is generally T-shaped.

28. The actuator according to claim 17, wherein said plastic portion is electrically conductive.

29. The actuator according to claim 28, further comprising a grounding pin, and wherein said plastic portion includes a hole for receiving said grounding pin.

30. The actuator according to claim 29, wherein said grounding pin extends through said arm and outwardly from said body.

31. The actuator according to claim 29, further comprising at least two arms and wherein said grounding pin connects said arms to ground.

32. The actuator according to claim 28, wherein said body includes a journal and a segment of said plastic portion is exposed within said journal.

33. The actuator according to claim 32, wherein said arms are connected to ground through contact with a bearing disposed in said journal.

34. The actuator according to claim 28, wherein said plastic portion is formed from glass and carbon reinforced thermoplastic material.

35. The actuator according to claim 17, wherein said arm includes at least one wire guide for receiving a wire which attaches to the read/write head.

36. The actuator according to claim 35, wherein said wire guide comprises a plurality of staggered protrusions extending from said arm.

37. The actuator according to claim 17, wherein one end of said arm includes a feature that cooperates with a portion of said body to secure said arm to said body.

38. The actuator according to claim 17, wherein said arm includes a generally flat portion of uniform thickness extending between said first and second ends.

39. The actuator according to claim 17, wherein said arm includes at least one flat surface on one edge of said arm for aligning said arm in a mold.

40. A swing-type actuator, comprising:
a coil;
an arm for carrying a read/write head, said arm having first and second ends and comprising a plastic portion and a metal mounting pad;
a molded thermoplastic body having a first portion molded about a portion of said coil to join said coil to said body, and having a second portion molded about said first end of said arm to join said arm to said body; and
a bobbin having a body, a plurality of terminal pin sleeves having terminal pins disposed therein and a bridge member joining said bobbin body and said sleeves.

41. The actuator according to claim 40, wherein said coil includes a plurality of lead wires attached to said terminal pins and said coil is disposed about said bobbin body.

42. The actuator according to claim 41, wherein said body and said plastic portion are electrically conductive, and said bobbin insulates said terminal pins from said body and said plastic portion.

43. The actuator according to claim 42, wherein said body includes a journal and said arms are connected to ground through contact between said journal and a bearing disposed in said journal.

44. The actuator according to claim 17, wherein said body includes a journal on which said actuator pivotally rotates.

45. The actuator according to claim 44, wherein said body and said plastic portion are electrically conductive and said arms are connected to ground through contact between said journal and a bearing disposed in said journal.

46. A swing-type actuator, comprising:
a coil;
an arm for carrying a read/write head, said arm having first and second ends and comprising a plastic portion and a metal mounting pad; and
a body joining said coil to the first end of said arm.

47. The actuator according to claim 46, wherein the body includes a journal disposed between said coil and said arm.

48. The actuator according to claim 47, wherein said plastic portion of the arm and said body are molded from thermoplastic material.

49. The actuator according to claim 48, wherein said plastic portion of the arm is formed from an electrically conductive thermoplastic material.

* * * * *

UNITED STATES PATENT AND TRADEMARK OFFICE
CERTIFICATE OF CORRECTION

PATENT NO. : 5,382,851
DATED : January 17, 1995
INVENTOR(S) : Robert J. Loubier

It is certified that error appears in the above-indentified patent and that said Letters Patent is hereby corrected as shown below:

Column 10, Claim 46, lines 1-6 should read as follows:

A swing-type actuator, comprising:
a coil;
a plastic arm for carrying a read/write head, said arm having first and second ends and a metal mounting pad; and
a body joining said coil to the first end of said plastic arm.

Signed and Sealed this

Twelfth Day of December, 1995

Attest:

BRUCE LEHMAN

Attesting Officer

Commissioner of Patents and Trademarks